Nov. 26, 1940. D. W. VER PLANCK ET AL 2,222,729
RESIN-CONTAINING COMPOSITE STRUCTURE
Filed Dec. 5, 1936
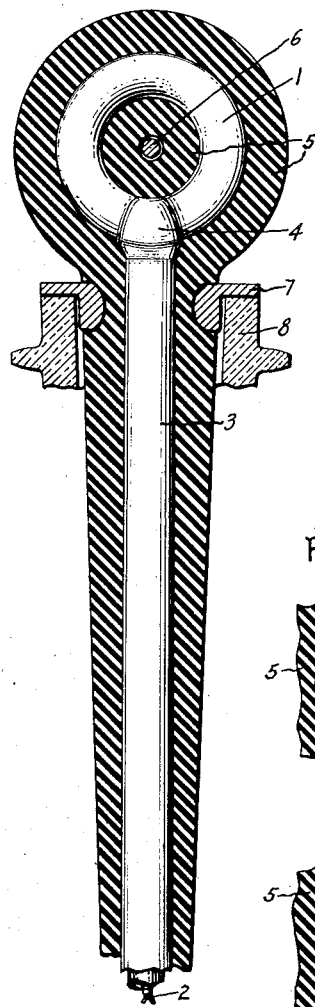
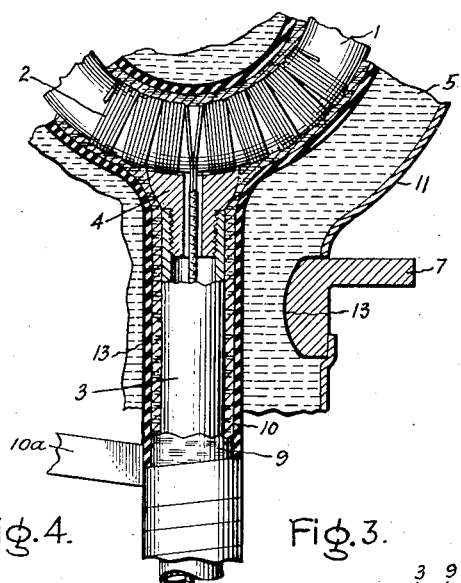
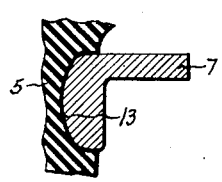
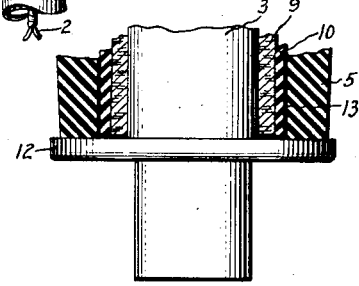
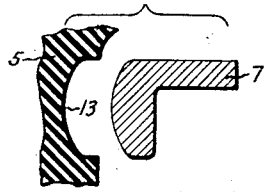
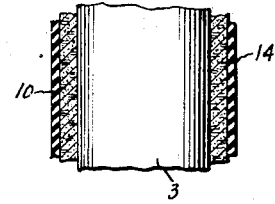
Inventor:
Dennistoun W. Ver Planck,
Edwin H. Brink,
by Harry E. Dunham
Their Attorney.

Patented Nov. 26, 1940

2,222,729

UNITED STATES PATENT OFFICE 2,222,729

RESIN-CONTAINING COMPOSITE STRUCTURE

Dennistoun W. Ver Planck, New Haven, Conn., and Edwin H. Brink, Drexel Hill, Pa., assignors to General Electric Company, a corporation of New York Application December 5, 1936, Serial No. 114,438

17 Claims. (Cl. 175—358)

This invention relates broadly to a resin-containing composite structure such, for instance, as electrical apparatus with part or parts of cast resin. More particularly it relates to cast articles comprising resinous compositions with inserts of material (for example, metal) having a contractability different from the resin. The invention is especially directed to, and has as a main object to provide various improvements and modifications in the art of casting resins and in the art of making resin-containing composite structures, for instance electrical apparatus such as current transformers insulated with cast resin. The invention also includes, and has as a further object to provide various improvements and modifications in cushioning or otherwise protecting metal inserts in resinous compositions, especially metal parts initially surrounded by, or surrounding, so-called "casting resin", that is, liquid synthetic resin which is converted to solid state after casting, for example, by subjecting to heat. An example of such resin is phenol-formaldehyde resin of the type or kind produced and sold by the Catalin Corporation of America under the trademark "Catalin" and described, for instance, in U. S. Patents 1,854,600; 1,858,168; 1,892,848; 1,909,786; 1,909,787, 1,909,788; and 1,909,789.

There has been needed heretofore, in connection with the manufacture of various kinds or types of coil-containing electrical apparatus, a simple, comparatively inexpensive and effective means for covering the coils thereof, which may be, for instance, refrigerator control coils or certain industrial and transformer coils. Various methods of covering coils previously have been tried, but have not been wholly satisfactory. Examples of such methods are: multiple varnish treatment; impregnating with a thermo-setting resin, then curing under heat or under heat and pressure; covering the coils with cellulose acetate or with compositions comprising asphalts, or fabricating a container to surround the coil. The objections to such methods are obviated by the present invention, in accordance with one embodiment of which coils and other parts of electrical apparatus are enveloped or surrounded by a substantial amount of casting resin, such as phenol-aldehyde casting resin, and the resin then subjected merely to heat to convert it to the insoluble and infusible state.

The present invention provides a novel resin-containing composite structure. Illustrative of a specific form of such structure is a high-voltage current transformer containing cast-resin insulation. Such current transformers are especially adapted for use with low oil-content, high-voltage circuit breakers. Heretofore the only current transformers available for such application have been the more costly porcelain spool-type transformers.

The present invention also includes within its scope improvements in the art of casting resins and, more particularly, in forming composite structures comprising cured or solidified cast resin having inserts therein.

A serious difficulty in the manufacture of composite structures comprising cast resin with metal bodies inserted therein is the tendency of the resin to crack around such metal inserts. This cracking results from the shrinkage stresses which develop upon cooling the article. These stresses occur because of the differences in contractability between the resin and the metal. As is well known, a cracked resin body is unsuited for use as electrical insulation. Solution of this problem has long been needed, particularly in the electrical art, and especially in the manufacture of composite structures comprising metal bodies of large size inserted in cast resin.

It has been known that stresses which develop in molded resinous compositions containing metal inserts having a contractability less than the resin may be relieved by wrapping the insert with cotton, silk or woolen tape. Such cushioning of metal inserts may be satisfactory when the resinous composition prior to hardening is a highly viscous mass, which is semi-fluid and non-penetrating in nature, but is wholly unsatisfactory when the resin is in liquid state, as is a casting resin, and remains in fluid state for a matter of hours and even days during the curing period. Furthermore, cushions heretofore prepared for such metal inserts, for example, those which are to be subjected to electrical potential, have not been designed to eliminate corona formation within the voids of an enveloping cushion, or to eliminate electrical breakdown of the cushioning material. That embodiment of the present invention which relates to the cushioning of inserts embedded in cast resin differs from the prior art in that it provides a cushion which comprises a porous, compressible layer superimposed on the insert and an impervious outer layer that seals said porous layer, for example, against infusion of resinous composition. By the use of such a cushion shrinkage stresses that occur during changes of temperature are so decreased that no substantial cracking of the resin takes place. This invention also provides means to prevent electrical breakdown within the region adjacent the insert.

In certain instances no cushion between the insert and the cast resin is necessary as, for instance, when the metal article wholly or partly surrounds a portion of a resin having a contractability greater than the metal. In such a case, the resin shrinks away from the metal during cooling from the curing temperature to atmospheric temperature, leaving an air space between the insert and the resin. To prevent electrical discharges within this space, it is necessary to provide a conducting surface which adheres to the resin when it shrinks away from the insert and which maintains electrical contact with the insert. This invention also includes means for accomplishing such result.

The novel features which are characteristic of our invention are set forth in the appended claims. The invention itself, however, will best be understood by reference to the following specification when considered in connection with the accompanying drawing in which Fig. 1 is a longitudinal view, partly in section, and broken away as shown, of a composite structure comprising a cushioned and resin insulated core, core-supporting knob and supporting tube of a current transformer; Fig. 2 is an enlarged fragmentary view partly in elevation and partly in section, of a portion of the upper part of the structure of Fig. 1, and with the resinous insulation surrounding the core, core-supporting knob and supporting tube shown in liquid state; Fig. 3 is an enlarged sectional view of a portion of the lower part of the structure, the upper part of which is shown in Fig. 1; Figs. 4 and 5 are enlarged sectional views of a portion of the upper part of Fig. 1 showing a metal ring partly surrounded by insulating resin; and Fig. 6 is an enlarged sectional view of a cushion superimposed on a metal body to be embedded in synthetic resinous composition and illustrating another embodiment of this invention.

With further reference to the drawing: As shown in Fig. 2, metal core 1 is provided with secondary windings 2 of enamel-covered copper wire, the core being supported by a heavy steel tube 3 to the upper end of which is fixedly attached, as shown, a core-supporting knob 4 which is made of non-magnetic material because of proximity to the secondary and core. Through an opening in this knob the secondary leads pass downward therethrough and through tube 3. As shown in Fig. 1 the cast resin insulation 5 is applied to the core and secondary, which are situated at the physical level of the high-voltage conductor. Through an opening provided as shown in the cast resin insulation (Fig. 1), the bare, uninsulated primary conductor 6 passes. Also surrounded by cast-resin insulation are the heavy steel tube 3 and the core-supporting knob 4. This tube and knob, together with the metal ring 7, provide a means for applying pressure to the gaskets on the porcelain shell 8, the lower portion of which (not shown) rests upon the metal flange 12 (Fig. 3), which is attached to the lower end of the steel tube 3. The shell is held rigidly between the flange 12 and the ring 7 by any suitable means. For example, the lower end of the tube 3 may be threaded, and by tightening a nut thereon the shell 8 will be firmly positioned between the said flange and ring. In order that the housing thus formed will be liquid-tight, suitable gaskets are interposed between the ring 7 and the shell 8 and between the flange 12 and the said shell. The tube gives the device lateral strength independent of all insulating material so that the column safely may be used to support the circuit breaker element with which it is to be used. It also affords a very convenient means for supporting the core during the casting process.

Superimposed on the core 1 with its windings 2, and also on the steel tube 3 and core-supporting knob 4 is a cushion comprising an inner layer 9 of a porous, compressible substance and an outer layer 10 (Figs. 2 and 3) of an impervious substance for sealing the porous layer 9, the outer layer 10 being shown for purpose of illustration at 10a in Fig. 2 in the form of a tape. The whole is surrounded by cast-resin insulating composition 5, which in Fig. 2 is shown as being in liquid state within mold 11, and in Figs. 1, 3, 4 and 5 as in solid state. The space between the cast-resin insulation 5 and the porcelain shell 8 may be filled with liquid insulating material such as mineral oil or halogenated cyclic hydrocarbons, or mixtures thereof, which are liquid in the temperature range in which electrical devices are exposed and operated. Insulating compositions comprising such halogenated cyclic hydrocarbons are described, for example, in Clark Patent 1,931,373. It is also possible to dispense with the petticoated porcelain shell, the necessary petticoats being cast in the resinous composition.

A conducting paint 13 is shown in Fig. 2 upon that part of the surface of the metal ring 7 which is in contact with the cast-resin insulating composition, and is shown again in Fig. 4 as separating the resin and metal surfaces. Figs. 4 and 5 are illustrative of the application of a conducting film to resinous insulating composition when such composition wholly or partly surrounds a metal body. In Fig. 5 separation of the resin and metal surfaces has been greatly exaggerated for the purpose of showing the conducting paint 13 attached to the solid resin surface. As shown in Fig. 2, the impervious sealing layer 10 may be coated with the conducting paint 13, which in Fig. 3 is shown as contacting both the underlying steel tube 3 and the metal flange 12; or, as shown in Fig. 6, in lieu of a conducting paint the steel tube 3 may be covered with an inner layer 14 comprising a porous, compressible substance impregnated with electrical conducting material such as powdered carbon, and an outer impervious sealing layer 10.

When a resinous material is in fluid state, it penetrates any single layer of a porous and permeable cushioning material to such an extent that the cushion surrounding the insert becomes just as hard and unyielding as the main body of the cast composition. Such penetration not only eliminates the cushioning effect of such a layer as a means for relieving shrinkage stresses, but it tends also to prevent longitudinal slippage of the cast composition on the insert. With relatively long inserts, the provision for slippage is just as important as cushioning for relieving stresses during radial expansion and contraaction.

Cushioning materials found suitable for use in accordance with the invention are such porous and compressible substances as, for example, cotton tape, cotton yarn, cork in sheet, tape or other form, sponge rubber, and the like.

For sealing the cushioning material against the influx of casting resin, rubber gum tape put on half lap has been found to be effective. Another method and material is to apply cellulose acetate tape, wound half lap, and sealed along its edges by dampening slightly with a suitable solvent such as acetone. Cellulose acetate and various synthetic rubber compounds applied in solution form also have proved satisfactory. Certain resinous compositions applied in fluid state, such as in the form of paints or varnishes, also may be used. Only such compositions may be employed, however, as will harden in place to form a dense, impervious sealing layer.

Some compressible materials, cork in particular, although porous, are practically impervious to casting resin in liquid state but may be porous enough to allow the passage of gases and vapors therethrough. In some cases permeability of the compressible material to gases may be definitely injurious, for instance, in connection with the use of casting resins that form an "air skin" on the free surface of the casting. With cork, such an air skin or boundary layer will form in the resin adjacent to its surfaces even though it will not form to any appreciable extent at the metal mold surfaces. This air skin or boundary layer may have a dielectric constant different from that of the main body of the resin. In particular, if the dielectric constant is lowered by the action of the air on the resin, a disproportionately large share of a voltage applied between the insert and another part of the cast article appears across the boundary layer and initiates electrical breakdown therein. In the case of a certain liquid casting resin containing about eight per cent water in the form of minute particles, the air skin or boundary layer consists of a partially dehydrated layer having a water content of the order of two per cent. Such a difference in water content results in a large difference in dielectric constant. Therefore with porous, compressible materials (for example, cork) that normally are substantially impervious to casting resin, an impervious external layer is applied for the primary purpose of preventing the action of the air on, or the dehydration of, a layer of the resin next to the cushion.

A porous material is inherently a poor dielectric substance, since it is full of air pockets in which corona may ocur. A cushion produced in accordance with this invention is protected against electrical stress, for example, by impregnating a porous compressible material with graphite or other conducting material, such a form of cushion being shown in Fig. 6; or, preferably, by applying to the external surface of the cushion a conducting paint 13 in which are suspended finely divided conducting particles, for instance, graphite, and bringing the conducting film, for example as shown in Fig. 3, into permanent contact with the underlying steel tube 3 and with flange 7 in order to prevent corona formation, that is, electrical breakdown, within the cushion. By the term "conducting paint" as used herein, we mean a coating composition having a resistance low enough that the voltage drops in the conducting layer due to the capacitance charging currents shall not be enough to cause the potential of the cushion surface to differ greatly from that of the underlying insert. As such a paint is applied in practicing this invention, the resistance of a coating thereof, in most instances, should be not more than about 100 ohms per centimeter square and advantageously may be, for example, approximately 80 ohms per centimeter square.

That embodiment of our invention which relates to the cushioning of a metal insert embedded in resinous composition will be better understood by the following more detailed description thereof:

A layer of porous material such, for instance, as sheet cork is wrapped tightly around a metal part. In one instance a 6-inch inside diameter by 10-inch outside diameter metal ring was covered with a ⅛-inch thick sheet of cork. In this particular case no cork was applied to the inside of the ring because, as has been mentioned hereinbefore, when metal surrounds resinous composition having a greater contractability than the metal, the resin shrinks away from the metal and cushioning of such part is therefore not usually necessary. In another case a 2⅜-inch outside diameter steel tube was wrapped with a 1/16-inch layer of cork.

The thickness of the cushioning layer depends upon such influencing factors as, for example, the following: (1) Difference in contractability of the resin and the insert material; (2) kind or type of cushioning material; (3) outside-to-outside dimension of the metal; (4) thickness of the resinous mass surrounding the metal; (5) mechanical stress allowable in the resin; (6) range of temperature through which the resin passes during cooling; and (7) temperature differential to which the particular casting is to be subjected.

In the case of a round metal tube or bar to be cast in resin produced and sold under the trademark "Catalin", a cushioning thickness of about 0.01 inch of a cushioning material such as cork per inch of the outside-to-outside dimension of the metal has been found to be effective in decreasing shrinkage stresses that occur during temperature changes. With cork as the porous, compressible layer for cushioning an insert embedded in casting resin, it may be estimated that, generally speaking, an effective cushioning thickness is one which is of the order of about 1 to 2 per cent of the outside-to-outside dimension of the metal insert.

If desired, the sheet cork may be covered with cotton tape better to hold it in place. The whole is sealed with a non-porous material such as rubber gum tape. Next the outside is coated with a conducting paint which contacts at one or more points the underlying metal part. The liquid resin is then poured into a mold containing the cushioned part supported in the desired position, and the whole is then subjected to a suitable curing temperature for a suitable length of time to convert the cast resin to an infusible and insoluble state.

Alternatively, a smooth layer of cork may be applied to metal inserts without using any permanent binding tape as hereinbefore described. The method comprises wrapping a single layer of sheet cork of the desired thickness around the insert forming a butt joint at the edges of the cork. The joint is then filled in and smoothed over with a cork putty containing ground cork, a binder, and a volatile solvent for the binder. A temporary binding tape is used on the insert while the cork putty is hardening. A half hour or so in a 100° C. oven is sufficient to evaporate the volatile solvent from the binder of the cork putty leaving at the joint a firm, resilient mass similar to ordinary sheet cork. The temporary binding tape is removed and the cork cushion sand-papered to remove surface irregularities and to form thereby a very smooth surface. Cork tape may be used, if desired, in place of sheet cork, the joints being filled with cork putty and the solvent subsequently evaporated therefrom as hereinbefore described.

The cork is then sealed with an impervious layer or layers. Advantageously the smoothed cork surface is first covered with a varnish comprising an alkyd resin which serves to fill any openings in the surface. The surface is then sealed with, for example, a solution containing rubber. This is to make the surface air- and moisture-tight. If the surface is not thus sealed, an air skin or dehydrated layer of lower dielectric constant forms in the cast resin next to the cushion. A phenolic-resin graphite conducting paint is then applied to the cushion as a final coating. The purpose of this latter coating is to remove electrical stress from the cushioning material. If such a conducting paint is not applied, the electrically weak cushioning material tends to puncture in spots, forming conducting points to the cast-resin insulation which result in electrical stress concentration in the cast-resin insulation itself. As a result of the smooth surface provided by the alternative method of cushioning hereinbefore described, the conducting paint may be given a high degree of polish by rubbing it, after it has dried for a few minutes, with fine sand-paper. A highly polished coating is very desirable from the electric gradient standpoint within the cast-resin insulation.

In cases wherein the metal article wholly or partly surrounds a portion of a cast resin having a contractability greater than the metal, a conducting surface is applied to the cast resin in solid state by applying to the metal surface in contact with the liquid resin a conducting film having a greater affinity for the solid resin than for the metal, whereby, as the resin shrinks, said film, which is shown in Figs. 2, 4 and 5, is transferred substantially completely from the surface of the metal to the adjacent resin surface. A conducting paint having a vehicle base of the same type as the cast resin advantageously may be employed. For example, with phenol-formaldehyde casting resins a conducting paint having a phenol-formaldehyde vehicle base is preferably applied to the metal surface. It has been observed that a paint containing phenol-formaldehyde vehicle base, possibly because it is of a nature compatible with phenol-formaldehyde casting resin, has so strong an affinity for such resin that a conducting film may be applied to its solid surface adjacent surrounding metal in the manner just described.

This invention provides a method of obviating the cracking of a cast resin mass containing inserts having a contractability different from the resin. As a result, composite structures may be made comprising solidified cast resin, essentially free from cracks, and, embedded therein, metallic bodies that occupy a relatively large volume of the total structure as compared with the volume of resin mass. The invention is particularly applicable to the electrical art, for example, in protectively covering electrical coils with a substantial amount of resin without impregnating the coil. The invention is thus clearly distinguished from the old and well-known processes of coil manufacture which involve impregnating the coil with a thermo-setting resin as described, for instance, in Baekeland Patents 1,213,144 and 1,213,726. The present invention provides means for making coils of accurate outside dimensions, since the finished coil, if not of the exact dimensions desired, may be machined to the dimensions sought. The finished coil is effectively protected from mechanical and chemical damage, has a smooth appearance and excellent weathering resistance.

From the foregoing description it will be seen that the present invention provides an electrical device comprising, in combination, an electrical coil, a covering therefor comprising a permeable, compressible inner layer and an outer substantially impervious layer sealing said permeable layer against infusion of liquid resin, and a mass of resin solidified from liquid state surrounding and in contact with said covering, said resin being under tension as a consequence of shrinkage stresses set up during the solidification thereof but, due to the compressibility of said covering, being substantially free from cracks.

The term "insert" as used hereinbefore, and in the claims which follow, includes a substance wholly or partly surrounding, or wholly or partly surrounded by a material comprising resinous composition initially in a pourable liquid state but curable to a solid state, which substance has a contractability different from the resin.

What we claim as new and desire to secure by Letters Patent of the United States is:

1. An article of manufacture comprising an electrical coil, a covering for said coil, said covering comprising a porous, compressible inner layer and an outer layer of cellulose acetate and being practically impervious to casting resin both initially and during curing thereof to solid state, and a substantial amount of cast resin in an insoluble and infusible solid state surrounding said coil and covering.

2. In electrical apparatus, the combination of a core, a winding of an insulated conducting element on said core, a covering for said core and winding, said covering comprising a porous, compressible layer and an outer layer of cellulose acetate and being practically impervious to casting resin both initially and during curing thereof to solid state, and a substantial amount of heat-hardened cast resin enveloping the whole.

3. As a covering for bodies inserted in a cured cast resin having a contractability different from said body, the combination of a porous compressible layer comprising cork with an outer layer of cellulose acetate, said covering being practically impervious to the casting resin while in its liquid state and during curing thereof to solid state.

4. In a composite structure comprising a metal body inserted in cast resin, a covering for said metal body comprising a sealed layer of cork.

5. A cushion for inserts in cast resin having a contractability greater than said insert comprising a layer of cork superimposed on the insert and, in addition thereto, an outer sealing layer comprising a rubber compound.

6. A cushion for metal bodies inserted in cast resin, said cushion comprising cork covered with a layer of a composition comprising alkyd resin and with an outer sealing layer containing rubber hydrocarbons.

7. In electrical apparatus comprising metal parts insulated with cast resin, a covering for such parts comprising a porous, compressible layer impregnated with electrical conducting material and, in addition thereto, an outer layer which is practically impervious to casting resin in liquid state.

8. In electrical apparatus comprising a metal conductor embedded in solid resinous substance having a contractability greater than said conductor, a covering superimposed on said conductor, said covering comprising a porous compressible layer and a practically impervious outer layer coated with a conducting film which also is in contact with the underlying metal conductor.

9. A method of obviating the cracking of a cast resin mass containing inserts having a contractability different from said resin which comprises covering the insert with a porous, compressible layer comprising cork to relieve stresses that develop during temperature changes, and sealing a surface of said porous layer with cellulose acetate to prevent infusion of said resin therein.

10. A method of cushioning a metal body inserted in resinous composition having a contractability greater than said body which comprises enveloping the metal body with a porous, compressible layer comprising cork to relieve stresses that develop during temperature changes and with an impervious outer layer to seal said porous layer.

11. A method of protectively covering metal conductors embedded in solid resinous substance of the kind which is in fluid state during casting thereof but convertible upon curing to solid state and having a contractability greater than said conductor, which comprises covering the conductor with a porous compressible layer, superimposing on said layer an impervious sealing layer, coating the sealing layer with a conducting film, and bringing said film into contact with the underlying metal conductor to prevent electrical breakdown within the region adjacent the conductor.

12. A composite structure comprising a metal body, a covering therefor comprising a sealed layer of cork, and cast resin in solid state surrounding the whole and directly in contact with the said cork layer.

13. An article of manufacture comprising an electrical coil, a covering for said coil comprising a sealed layer of cork, and cast resin in solid state surrounding said coil and covering.

14. In electrical apparatus, a core, a winding of an insulated conductor around said core, a covering for said core and winding comprising a sealed layer of cork, and a substantial amount of solid cast resin enveloping the whole.

15. An electrical device comprising, in combination, an electrical coil, a covering therefor comprising a permeable, compressible inner layer and an outer substantially impervious layer sealing said permeable layer against infusion of liquid resin, and a mass of resin solidified from liquid state surrounding and in contact with said covering, said resin being under tension as a consequence of shrinkage stresses set up during the solidification thereof but, due to the compressibility of said covering, being substantially free from cracks.

16. An electrical device comprising, in combination, a metal member, a covering for said member comprising a porous, compressible layer impregnated with electrical conducting material and an outer layer practically impervious to liquid resin, and a mass of resin solidified from liquid state surrounding and in contact with said covering.

17. An electrical device comprising, in combination, a metal member, a covering for said member comprising a porous compressible layer and a practically impervious outer layer coated with a conducting film which also is in contact with the underlying metal member, and a mass of resin solidified from liquid state surrounding and in contact with said covering.

DENNISTOUN W. VER PLANCK.
EDWIN H. BRINK.